United States Patent
Bushnell et al.

(10) Patent No.: US 7,522,909 B2
(45) Date of Patent: Apr. 21, 2009

(54) CONTENT ACCESS CONTROL SYSTEM FOR A MOBILE COMMUNICATION NETWORK

(75) Inventors: William Jackson Bushnell, St. Charles, IL (US); Leonard T. Pesheck, Downers Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 456 days.

(21) Appl. No.: 11/312,143

(22) Filed: Dec. 20, 2005

(65) Prior Publication Data
US 2007/0142039 A1 Jun. 21, 2007

(51) Int. Cl.
H04M 1/66 (2006.01)
H04M 3/42 (2006.01)
H04M 3/00 (2006.01)
H04B 7/00 (2006.01)

(52) U.S. Cl. ............... 455/411; 455/414.1; 455/419; 455/518; 455/519

(58) Field of Classification Search ........... 455/440, 455/411, 414.1, 415, 435.1, 26.1, 433, 565, 455/419, 518, 519; 370/235, 395.3
See application file for complete search history.

(56) References Cited

U.S. PATENT DOCUMENTS

| | | | |
|---|---|---|---|
| 2002/0168978 A1* | 11/2002 | Molnar et al. | 455/433 |
| 2005/0176407 A1* | 8/2005 | Tuomi et al. | 455/411 |
| 2007/0061363 A1* | 3/2007 | Ramer et al. | 707/104.1 |

* cited by examiner

*Primary Examiner*—Nick Corsaro
*Assistant Examiner*—Shannon R Brooks

(57) ABSTRACT

The content access control system has a content permissions field in the Home Location Register database for each mobile subscriber. The content permissions data are managed by a content manager who has content access responsibility for the mobile subscriber pursuant to an existing management relationship, such as parent-child or employer-employee. The content manager initiates a communication connection to a designated content access control administration system and uniquely identifies the subscriber via their mobile communication device identification and assigns one or more content rating access permissions to each identified subscriber. The content rating permissions comprise a definition of the content that is prohibited and/or permitted by indicating via selecting content ratings or other such code definitions to identify the appropriate content. The content access control administration system loads the content ratings permissions into the Home Location Register (HLR) and/or Home Subscriber Server (HSS) associated with the identified mobile communication device(s).

12 Claims, 4 Drawing Sheets

CONTENT ACCESS CONTROL SYSTEM

CONTENT ACCESS CONTROL SYSTEM WITH CERTIFICATES

CONTENT ACCESS CONTROL SYSTEM FOR A MOBILE COMMUNICATION NETWORK

FIELD OF THE INVENTION

This invention relates to mobile communication networks and to a system for automatically restricting access to content by mobile terminal devices pursuant to a content rating system.

BACKGROUND OF THE INVENTION

It is a problem in the field of mobile communication networks to regulate the nature of the content delivered to subscribers. In particular, inappropriate content should not be purchased, downloaded, or streamed to the mobile terminal devices of young subscribers or those who elect to not receive such content. To avoid legal issues relating to young children or other subscribers receiving inappropriate materials, Mobile Service Providers are presently instituting a Content Rating system that provides a descriptive rating for all content that is either offered by Mobile Service Providers or being transported over their networks to subscribers. However, the content industry is fragmented and they offer content ratings and control solutions from multiple sources—each independently deployed and source specific in their operation and ratings. Thus, Mobile Service Providers receive inconsistently rated content from many applications sources across the network and this content requires additional rating and enforcement by the Mobile Service Provider to produce a consistent content rating that can be used not only by the Mobile Service Providers but also by the subscribers.

The various types of content to be rated include at least:
1. Music—streams and downloads
2. Video—clips and streams
3. Games—downloads and interactive formats
4. Lotteries and Gambling sources
5. Adult Texting—WEB-logging (Blogging)
6. Web content This content requires that a rating be assigned and associated with the content to describe not only the type of content but also its nature before the content is loaded onto a Server by either the Mobile Service Provider or the content source for delivery to the subscribers.

The primary issue relating to the delivery of this content is how to query and enforce rules that define who can receive subscriber-appropriate content. One existing solution is to have the content source server, upon receipt of an access request from a subscriber, host a check of the subscriber identity against an internal database of subscribers maintained at the individual content source server to determine whether the requesting subscriber is authorized to receive the requested content. The disadvantage of this solution is that every content source server must be provisioned with and maintain an internal database of authorized subscribers. These databases must be frequently updated and there is likely to be inconsistencies among the databases.

BRIEF SUMMARY OF THE INVENTION

The present Content Access Control system for a mobile communication network eliminates the problems of having each content source server store data to validate each mobile subscriber's content permissions The content access permission data are managed by a content manager who has content access responsibility for the mobile subscriber pursuant to an existing management relationship, such as parent-child or employer-employee. The content manager initiates a communication connection to a designated Content Access Control Administration System and uniquely identifies the subscriber via their mobile communication device identification and assigns one or more content rating access permissions to each identified subscriber. The content rating permissions comprise a definition of the content that is prohibited and/or permitted by indicating via selecting content ratings or other such code definitions to identify the appropriate content. The Content Access Control Administration System loads the content ratings permissions into the Home Location Register (HLR) and/or Home Subscriber Server (HSS) associated with the identified mobile communication device(s) via the Operation Support Systems (OSS) and element Management Systems (eMS). The subscriber's content permissions information is then automatically handed off to the Visited Location Registers (VLR) along with other subscriber authorization data as the subscriber roams among the cell sites to be available whenever the subscriber connects to various content servers or sources.

When the mobile subscriber requests a content provider to provide access to a requested content element, the content provider must identify the content ratings field data associated with the requested content and ensure that the subscriber is authorized to receive the requested content. The content provider then uses the subscriber content permissions information received during the request to verify the appropriateness of the requested content prior to delivery of the content. If the requested content is not authorized, the content provider blocks access to the requested content and transmits a blocked content notification to the subscriber and, optionally, to the content manager supervising the subscriber.

This rating solution also works when attempts are made to browse the Internet, because the various Internet Gateways use the same content permissions information to filter and enforce ratings. The advantages of this system is that the mobile service provider has a single place to provision all mobile subscribers for content permissions information and there is less traffic congestion when the content sources check subscriber content permissions information.

DETAILED DESCRIPTION OF THE INVENTION

Content Access Control System Architecture and Message Flow

The content management activity applies to an existing management relationship (such as parent-child or employer-employee) and consists of a content managing party determining an approved set of categories for content access for one or more managed parties. This process can be applied to diverse applications including, but not limited to, a parent determining appropriate content for their children or an employer determining appropriate content for their employees when the employee uses an employer-supplied mobile phone. The content management activity is predicated on the use of a content rating system that characterizes the nature of the content that is stored on content servers or that is accessed via gateways which serve to manage backend content. In any configuration, there is a content rating assigned to the content, and this content rating is used to filter the content by regulating which subscribers can access the content.

Figure 1:
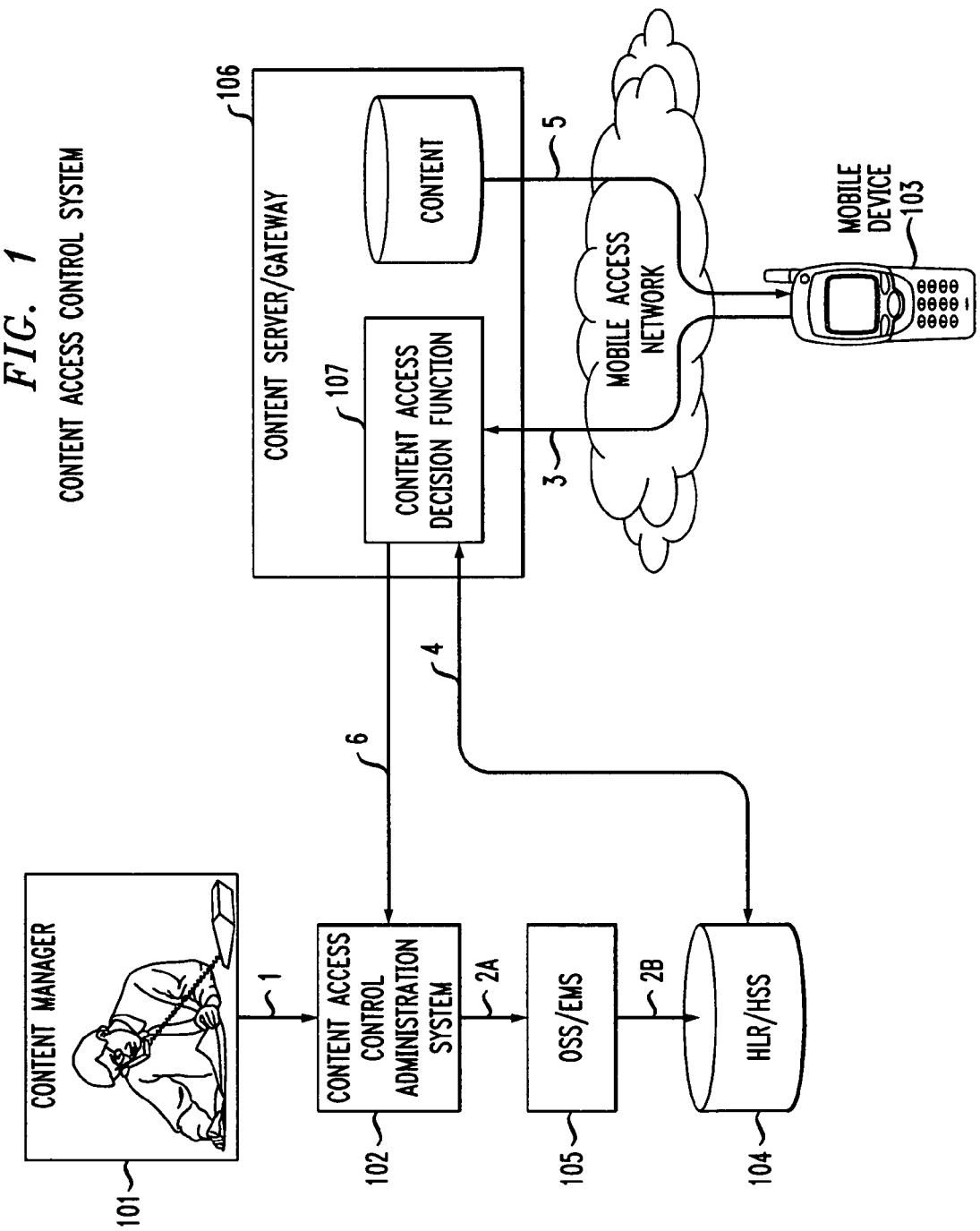
FIG. 1 illustrates, in block diagram form, the functional architecture of the present Content Access Control System for a mobile communication network and a message flow therein.
Figure 2:
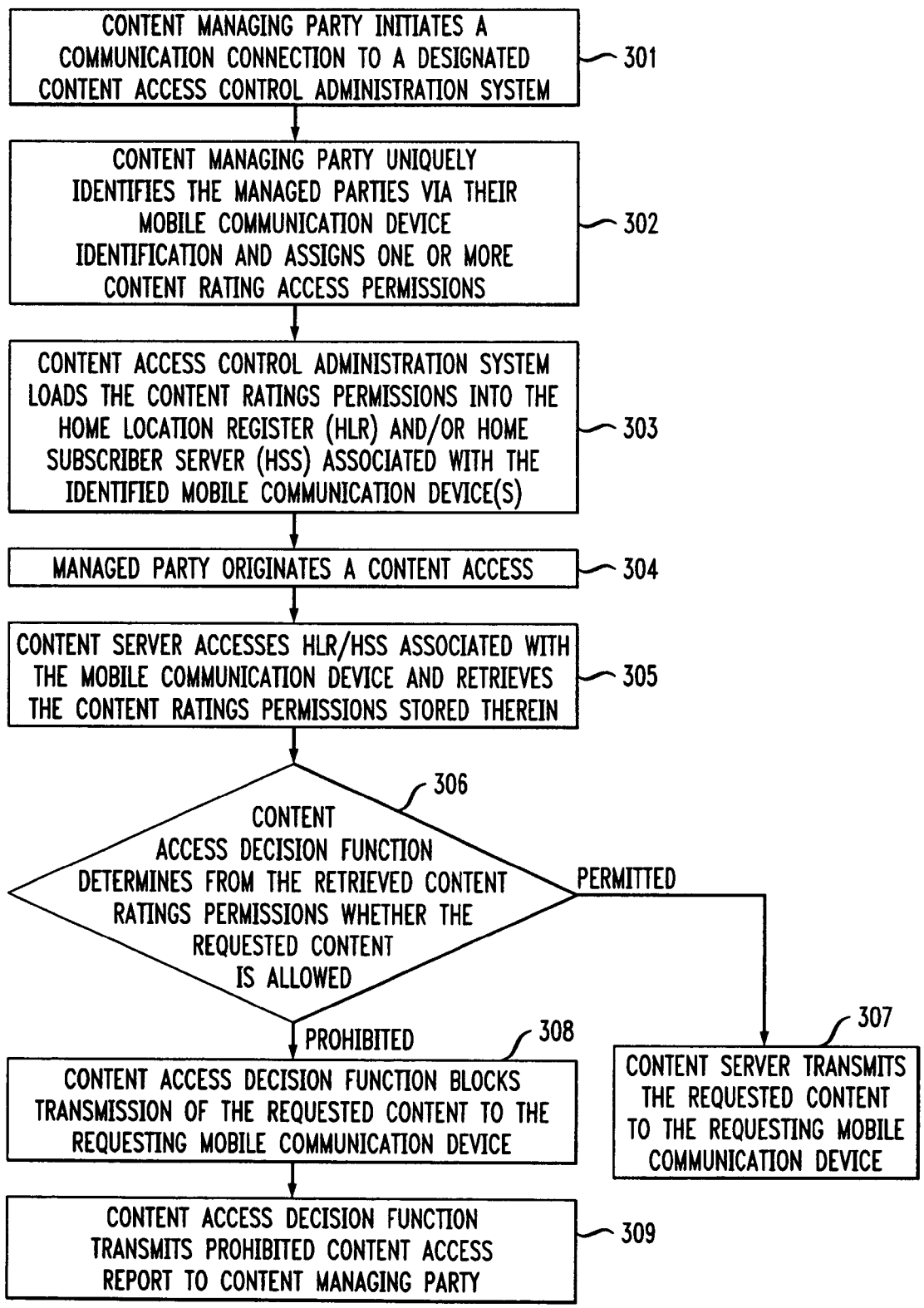
FIG. 2 illustrates, in flow diagram form, the operation of the Content Access Control System for a mobile communication network of FIG. 1 to respond to a request for selected content.

FIG. 1 illustrates, in block diagram form, the functional architecture of the present Content Access Control system for a mobile communication network and a message flow therein, and FIG. 2 illustrates, in flow diagram form, the operation of the Content Access Control system for a mobile communication network of FIG. 1 to respond to a request for selected content. For the purposes of simplicity of description, the content managing party is termed "parent" herein, although this term is intended to be inclusive of all types of content managers, and the managed parties are termed "children" herein, although this term is intended to be inclusive of all types of managed parties. In addition, all of the network elements that are used to implement the call connections are not described, since these are well known and unnecessary to understand to the concepts described herein.

In operation, at step 301, the parent (content managing party) terminal device 101 initiates a communication connection via path 1 to a Content Access Control Administration System 102 such as a WEB site that is accessible via the Internet. This connection could also be implemented via the mobile communication network, using the parent's mobile communication device. At step 302, the parent uniquely identifies their children (managed parties) via their mobile communication device 103 identification and assigns one or more content rating access permissions to each identified mobile device. The content rating permissions comprise a definition of the content that is prohibited and/or permitted by indicating via selecting content ratings or other such code definitions to identify the appropriate content. The Content Access Control Administration System 102 at step 303 loads the content ratings permissions via path 2A, 2B into the Home Location Register (HLR) and/or Home Subscriber Server (HSS) 104 associated with the identified mobile communication device(s) 103 via Operation Support Systems (OSS) and element management systems (eMS) 105.

When the child (managed party) uses their mobile communication device 103 at step 304 to access of content from a content server 106 or a gateway via path 3, the content server/gateway accesses HLR/HSS 104 associated with the mobile communication device 103 at step 305 via path 4 and retrieves the content ratings permissions stored therein associated with the requesting mobile communication device 103. At Step 306, the Content Access Decision Function 107 within the content server/gateway 106 uses the retrieved content rating permission to determine whether the requested content is allowed by the parent (content managing party). If the content is within the allowable content defined by the content ratings permissions, the content server/gateway transmits the requested content via path 5 to the requesting mobile communication device 103 at step 307. If the content is not within the allowable content defined by the content ratings permissions, the Content Access Decision Function 107 blocks transmission of the requested content to the requesting mobile communication device 103 at step 308 and instead transmits a message to the requesting mobile communications device 103 indicating that the requested content is blocked. Optionally, the Content Access Decision Function 107 also transmits a prohibited content access report via path 6 at step 309 to the Content Access Control Administration System indicative of the attempt to access prohibited content and the identity of the content requesting party.

Content Access Control System Architecture and Alternative Message Flow

Figure 3:
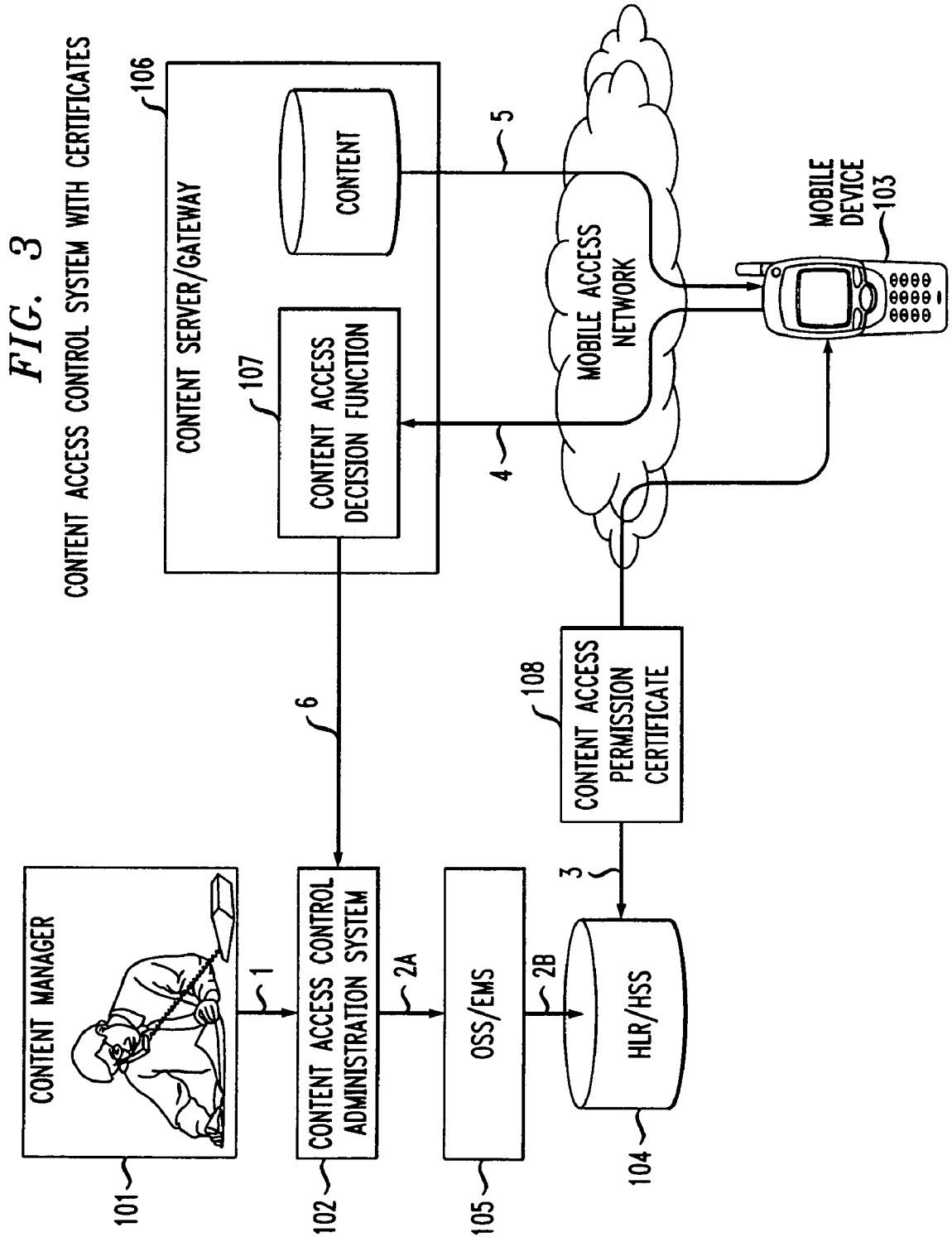
FIG. 3 illustrates, in block diagram form, the functional architecture of the present Content Access Control System for a mobile communication network and an alternative message flow therein.
Figure 4:
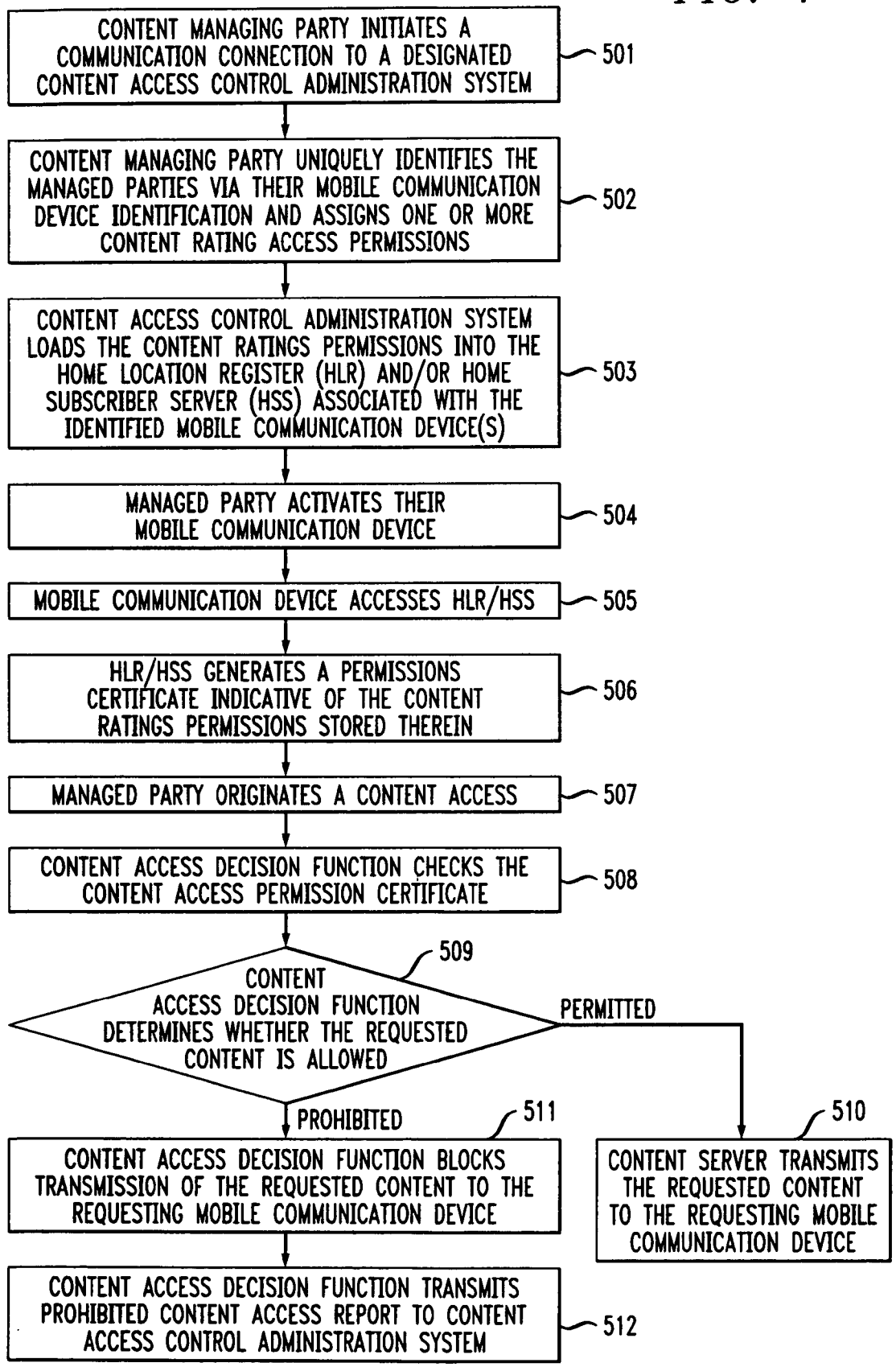
FIG. 4 illustrates, in flow diagram form, the operation of the Content Access Control System for a mobile communication network of FIG. 3 to respond to a request for selected content.

FIG. 3 illustrates, in block diagram form, the functional architecture of the present Content Access Control system for a mobile communication network and an alternative message flow therein, and FIG. 4 illustrates, in flow diagram form, the operation of the Content Access Control System for a mobile communication network of FIG. 4 to respond to a request for selected content. For the purposes of simplicity of description, the content managing party is termed "parent" herein, although this term is intended to be inclusive of all types of content managers, and the managed parties are termed "children" herein, although this term is intended to be inclusive of all types of managed parties.

In operation, at step 501, the parent (content managing party) at terminal device 101 initiates a communication connection via path 1 to a designated Content Access Control Administration System 102 such as a WEB site that is accessible via the Internet. This connection could also be implemented via the mobile communication network, using the parent's mobile communication device. At step 502, the parent uniquely identifies their children (managed parties) via their mobile communication device 103 identification and assigns one or more content rating access permissions to each identified mobile device. The content rating permissions comprise a definition of the content that is prohibited and/or permitted by indicating via selecting content ratings or other such code definitions to identify the appropriate content. The Content Access Control Administration System 102 loads the content ratings permissions into the Home Location Register (HLR) and/or Home Subscriber Server (HSS) 104 associated with the identified mobile communication device(s) via the Operations Support Systems or the Element Management Systems (EMS) 105 at step 503 via path 2A, 2B.

When the child (managed party) activates their mobile communication device 103 at step 504, the mobile communication device 103 at step 505 accesses the subscriber's HLR 104 via path 3 and receives a Content Access Permission Certificate 108 from HLR 104 that defines the content ratings permissions stored therein associated with the requesting mobile communication device 103 at step 506. When the subscriber at step 507 attempts to access a content server 106 via path 4, the mobile device includes in the content request message the Content Access Permission Certificate 108. At step 508, the Content Access Decision Function 107 checks the Content Access Permission Certificate 108 and determines whether the requested content is allowed by the parent (content managing party at step 509. If the content is within the allowable content defined by the content ratings permissions, the content server/gateway 106 transmits the requested content via path 5 to the requesting mobile communication device 103 at step 510. If the content is not within the allowable content defined by the content ratings permissions, the Content Access Decision Function 107 blocks transmission of the requested content to the requesting mobile communication device 103 at step 511 and instead transmits a message to the requesting mobile communications device 103 via path 5 indicating that the requested content is blocked. Optionally, the Content Access Decision Function 107 also transmits a prohibited content access report to the Content Access Control Administration System 102 via path 6 indicative of the attempt to access prohibited content and the identity of the content requesting party at step 512.

Extensions

The preceding described a centralized Content Access Control System for restricting access to multiple content servers by a mobile device. With minor modifications, the same approach can be used to restrict access to content by children using PCs to access email, web sites, and BLOGs. It can also be used to restrict access to audio content accessed via the PSTN or to access video content via a cable TV network. Furthermore, one Content Access Control System can provide simultaneous content access control across mobile, Internet, PSTN, and cable networks.

SUMMARY

The present Content Access Control system for a mobile communication network implements a content permission field in the Home Location Register database for each mobile subscriber so that, when the mobile subscriber requests access to a selected content, the Content Server can determine if the content is appropriate for the owner of the mobile device. The mobile device's content permissions information is stored in the Visited Location Registers (VLR) along with other subscriber authorization data as the subscriber roams among the cell sites to be available whenever the subscriber connects to various content servers or sources.

What is claimed as new and desired to be protected by Letters Patent of the United States is:

1. A content access control system for a mobile communications network for regulating subscriber access to content stored by a plurality of content servers which are accessible via said mobile communications network, comprising:
    content access control administration means for enabling a content manager to set subscriber content permissions for at least one subscriber served by said mobile communications network;
    rating memory means for storing said subscriber content permissions associated with said subscriber;
    content access certificate means, responsive to a subscriber activating their subscriber communications device, for loading a certificate containing said subscriber content rating from said rating memory means into said subscriber communications device; and
    content server means for enabling said subscriber to access said requested content from said identified content server using said subscriber communications device if said retrieved certificate containing said subscriber content rating corresponds to a content rating assigned to said requested content.

2. The content access control system of claim 1 wherein said rating memory means comprises:
    at least one of a Home Location Register and a Home Subscriber Server assigned to serve said subscriber communications device.

3. The content access control system of claim 1 wherein said content access decision means comprises:
    content permissions retrieval means, located in said content server and responsive to said subscriber requesting access to a selected content from said content server, for querying said subscriber communications device to retrieve said certificate containing said subscriber content permissions for said subscriber.

4. The content access control system of claim 1 further comprising:
    content blocking means, responsive to said retrieved content rating of said requested content failing to correspond to a content rating assigned to said requested content, for preventing said subscriber from retrieving said requested content from said content server.

5. The content access control system of claim 4 further comprising:
    content access decision message means, responsive to said content blocking means, for transmitting a message to said subscriber indicative of blocking said requested content.

6. The content access control system of claim 4 further comprising:
    content access decision message means, responsive to said content blocking means, for transmitting a message to said content access control administration means indicative of blocking said content requested by said subscriber.

7. A method for managing access to content for a mobile communications network for regulating subscriber access to content stored by a plurality of content servers which are accessible via said mobile communications network, comprising:
    enabling a content manager to set subscriber content permissions for at least one subscriber served by said mobile communications network;
    storing said subscriber content permissions associated with said subscriber in a rating memory;
    loading, in response to a subscriber activating their subscriber communications device, a certificate containing said subscriber content rating from said rating memory into said subscriber communications device; and
    enabling said subscriber to access said requested content from said identified content server using said subscriber communications device if said retrieved certificate containing said subscriber content rating corresponds to a content rating assigned to said requested content.

8. The method for managing access to content for a mobile communications network of claim 7 wherein said rating memory comprises:
    at least one of a Home Location Register and a Home Subscriber Server assigned to serve said subscriber communications device.

9. The method for managing access to content for a mobile communications network of claim 7 wherein said step of retrieving comprises:
    querying, by said content server and responsive to said subscriber requesting access to a selected content from said content server, said subscriber communications device to retrieve said certificate containing said subscriber content permissions for said subscriber.

10. The method for managing access to content for a mobile communications network of claim 7 further comprising:
    preventing, in response to said retrieved content rating of said requested content failing to correspond to a content rating assigned to said requested content, said subscriber from retrieving said requested content from said content server.

11. The method for managing access to content for a mobile communications network of claim 10 further comprising:
    transmitting, in response to said step of blocking, a message to said subscriber indicative of blocking said requested content.

12. The method for managing access to content for a mobile communications network of claim 10 further comprising:
    transmitting, in response to said step of blocking, a message to said rating memory indicative of blocking said content requested by said subscriber.

* * * * *